(12) United States Patent
Ishizaki et al.

(10) Patent No.: US 11,053,562 B2
(45) Date of Patent: Jul. 6, 2021

(54) DISPERSION STRENGTHENED AUSTENITIC STAINLESS STEEL ARTICLE, METHOD FOR MANUFACTURING SAME AND PRODUCT MADE OF SAME

(71) Applicant: Hitachi, Ltd., Tokyo (JP)

(72) Inventors: Takahiro Ishizaki, Tokyo (JP); Yusaku Maruno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 694 days.

(21) Appl. No.: 15/762,575

(22) PCT Filed: Oct. 19, 2016

(86) PCT No.: PCT/JP2016/080918
§ 371 (c)(1),
(2) Date: Mar. 23, 2018

(87) PCT Pub. No.: WO2017/073422
PCT Pub. Date: May 4, 2017

(65) Prior Publication Data
US 2018/0274053 A1    Sep. 27, 2018

(30) Foreign Application Priority Data
Oct. 30, 2015 (JP) .............................. JP2015-213972

(51) Int. Cl.
*B22F 1/00* (2006.01)
*B22F 3/10* (2006.01)
(Continued)

(52) U.S. Cl.
CPC .............. *C21D 9/0068* (2013.01); *B22F 3/10* (2013.01); *B22F 3/24* (2013.01); *B22F 9/04* (2013.01);
(Continued)

(58) Field of Classification Search
CPC ........ B22F 1/0014; B22F 1/0011; B22F 3/10; B22F 2304/15; B22F 9/04; C21D 6/004;
(Continued)

(56) References Cited

U.S. PATENT DOCUMENTS 5,316,597 A    5/1994    Takahiko et al.
2002/0164259 A1    11/2002    Ishibashi et al.
2017/0167005 A1    6/2017    Ishizaki et al.

FOREIGN PATENT DOCUMENTS

EP    0747497 A1 *    12/1996    ......... C22C 33/0285
EP    1956100 A1 *    8/2008    ........... C21D 8/0431
(Continued)

OTHER PUBLICATIONS

WO-2016006280-A1 English Translation, Kaneda Junya, Espacenet, 2016 (Year: 2016).*

(Continued)

*Primary Examiner* — Anthony J Zimmer
*Assistant Examiner* — Jacob James Gusewelle
(74) *Attorney, Agent, or Firm* — Mattingly & Malur, PC

(57) ABSTRACT

An objective of the invention is to provide an austenitic stainless steel article having superior irradiation resistance and stress corrosion cracking resistance than before while maintaining mechanical properties equivalent to those of conventional ones. There is provided a dispersion strengthened austenitic stainless steel article, including: 16-26 mass % of Cr; 8-22 mass % of Ni; 0.005-0.08 mass % of C; 0.002-0.1 mass % of N; 0.02-0.4 mass % of O; at least one of 0.2-2.8 mass % of Zr, 0.4-5 mass % of Ta, and 0.2-2.6 mass % of Ti; and a balance consisting of Fe and inevitable impurities. The Zr, Ta and Ti components form inclusion particles in the stainless steel article by combining with the (Continued)

C, N and O components. The stainless steel article has an average grain size of 1 μm or less and a maximum grain size of 5 μm or less.

8 Claims, 3 Drawing Sheets

(51) Int. Cl.
| | |
|---|---|
| *B22F 3/15* | (2006.01) |
| *B22F 3/24* | (2006.01) |
| *B22F 9/04* | (2006.01) |
| *C21D 6/00* | (2006.01) |
| *C21D 6/02* | (2006.01) |
| *C21D 9/00* | (2006.01) |
| *C22C 32/00* | (2006.01) |
| *C22C 33/02* | (2006.01) |
| *C22C 38/00* | (2006.01) |
| *C22C 38/48* | (2006.01) |
| *C22C 38/50* | (2006.01) |
| *C22C 38/02* | (2006.01) |
| *C22C 38/04* | (2006.01) |
| *G21C 21/18* | (2006.01) |
| *G21C 7/10* | (2006.01) |
| *B22F 3/20* | (2006.01) |

(52) U.S. Cl.
CPC .............. *C21D 6/004* (2013.01); *C21D 6/02* (2013.01); *C22C 32/0026* (2013.01); *C22C 38/001* (2013.01); *C22C 38/002* (2013.01); *C22C 38/004* (2013.01); *C22C 38/02* (2013.01); *C22C 38/04* (2013.01); *C22C 38/48* (2013.01); *C22C 38/50* (2013.01); *G21C 7/10* (2013.01); *G21C 21/18* (2013.01); *B22F 1/0014* (2013.01); *B22F 3/15* (2013.01); *B22F 3/20* (2013.01); *B22F 2003/247* (2013.01); *B22F 2003/248* (2013.01); *B22F 2301/35* (2013.01); *B22F 2304/15* (2013.01); *B22F 2998/10* (2013.01); *C21D 2211/001* (2013.01); *C22C 33/0285* (2013.01)

(58) Field of Classification Search
CPC ......... C21D 6/02; C22C 38/002; C22C 38/48; C22C 38/001; C22C 38/50
See application file for complete search history.

(56) References Cited

FOREIGN PATENT DOCUMENTS

| | | | |
|---|---|---|---|
| JP | 5-59494 A | 3/1993 | |
| JP | 08-337853 A | 12/1996 | |
| JP | 2002-256400 A | 9/2002 | |
| JP | 2002-285289 A | 10/2002 | |
| JP | 2014-080664 A | 5/2014 | |
| WO | 2016/006280 A1 | 1/2016 | |
| WO | WO-2016006280 A1 * | 1/2016 | ............... G21C 7/10 |

OTHER PUBLICATIONS

Takahiro Ishizaki, et al., "Development of Reactor of RBWR for Long-Lived Transuranium Elements Burner", 2015 Fall Meeting of Atomic Energy Society of Japan, Aug. 21, 2015.
International Search Report of PCT/JP2016/080918 dated Jan. 24, 2017.
Chinese Office Action received in corresponding Chinese Application No. 201680053515.5 dated Apr. 3, 2019

* cited by examiner

DISPERSION STRENGTHENED AUSTENITIC STAINLESS STEEL ARTICLE, METHOD FOR MANUFACTURING SAME AND PRODUCT MADE OF SAME

TECHNICAL FIELD OF THE INVENTION

The present invention relates to a technique of a high-strength and highly corrosion-resistant stainless steel, particularly a dispersion strengthened austenitic stainless steel article, a method for manufacturing the stainless steel article, and a product made of the stainless steel article.

DESCRIPTION OF BACKGROUND ART

In general, an austenitic stainless steel has higher mechanical strength and corrosion resistance than a carbon steel, and has favorable processability (e.g., favorable ductility and toughness) among stainless steels. Therefore, an austenitic stainless steel is used as a material of various plant members. An austenitic stainless steel is used, for example, for a core shroud or a recirculation pipe of a nuclear power plant.

An austenitic stainless steel exhibits high corrosion resistance as a Cr (chromium) component in the steel forms a passive film on the surface of the steel. However, it is known that stress corrosion cracking (SCC) is prone to occur under a specific corrosion environment (e.g., under a high-temperature and high-pressure water environment). In particular, it is pointed out that in cases where an austenitic stainless steel is used in a nuclear power plant, there is a possibility that introduction of an irradiation defect into the stainless steel grain through exposure to neutron irradiation accelerates Cr depletion at a grain boundary, thereby inducing stress corrosion cracking (irradiation assisted stress corrosion cracking). In order to reduce the susceptibility to such irradiation assisted stress corrosion cracking, a stainless steel material having excellent irradiation resistance and stress corrosion cracking resistance is required.

For example, Patent Literature 1 (JP Hei8-337853 A) discloses a highly corrosion-resistant and high-strength austenitic sintered alloy characterized by including, in terms of weight, C: 0.1% or less, Si: 1% or less, Mn: 2.0% or less, Ni: 9 to 30%, and Cr: 14 to 20%, by an average grain size of 1 μm or less, and by an austenite phase of 90 volume % or more. PLT 1 also discloses a highly corrosion-resistant and high-strength austenitic sintered alloy characterized by further including at least one of Mo: 3% or less, Ti: 1.0% or less, Zr: 2.0% or less, and Nb: 1.0% or less.

In addition, Patent Literature 2 (JP 2002-285289 A) discloses a high-strength ferritic stainless steel characterized by including, in terms of weight, Fe: 69.5 to 88.5% and Cr: 11 to 30%. In the high-strength ferritic stainless steel, at least one of Cr, Ti and Zr oxides is dispersed in a state of a grain size of 0.02 μm or less. The high-strength ferritic stainless steel has a structure mainly made of a ferrite structure, an oxide phase, and a carbide phase formed by chemical combination with C which is inevitably mixed, and has a grain size of 1 μm or less.

CITATION LIST

Patent Literature

Patent Literature 1: JP H08 (1996)-337853 A; and
Patent Literature 2: JP 2002-285289 A.

SUMMARY OF THE INVENTION

Problems to be Solved by the Invention

According to Patent Literature 1, by ultra refinement into a uniform grain size, it is possible to provide an austenitic steel having excellent corrosion resistance, mechanical strength, and irradiation damage resistance, and a nuclear power plant component using the same. In addition, because of excellent irradiation damage resistance, a significant effect of increasing safety and reliability of a nuclear power plant component can be obtained.

The technical idea that ultra refinement of grain size of an austenitic stainless steel contributes to an increase in mechanical strength or an increase in irradiation damage resistance of a steel material is believed to be true. However, the technique of Patent Literature 1 focuses only on average grain size and does not take into account a localized coarse grain due to non-uniformity of the structure. In other words, when a coarse grain exists even locally, there is a concern that irradiation assisted stress corrosion cracking could occur starting at the coarse grain.

According to Patent Literature 2, it is possible to provide a ferritic stainless steel having increased toughness and processability as well as increased strength when a powder having an ultra fine grain structure obtained by mechanical alloying, mechanical milling or the like is bulked with the structure thereof being maintained. In addition, reinforcement is mainly made by grain refinement, and therefore it is possible to realize a material having high strength and high functionality without addition of a special reinforcing element.

Meanwhile, a ferritic stainless steel is said to have relatively higher SCC resistance than an austenitic stainless steel, but the mechanical properties (e.g., ductility, toughness, and processability) and weldability are said to be relatively lower. Because of such drawbacks regarding the mechanical properties and weldability, a ferritic stainless steel is less intended to be used under harsh corrosion environment and stress loading environment of a nuclear power plant.

On the other hand, based on recent year's trend toward enhancement of safety of a nuclear power plant, a nuclear power plant is strongly required to have higher durability and long-term reliability than before. Thus, as the material used for a nuclear power plant member, a stainless steel is also strongly required to have superior irradiation resistance and stress corrosion cracking resistance than before.

In addition, in development of stainless steel articles, meeting required properties is an essential condition. It is also one of the most important issues from a commercialization viewpoint to provide such a stainless steel easily and reproducibly (i.e., at low cost).

Therefore, in order to meet the aforementioned requirements, it is an objective of the present invention to provide an austenitic stainless steel article having superior irradiation resistance and stress corrosion cracking resistance than before while maintaining the mechanical properties equivalent to those of conventional ones. Also, another objective of the invention is to provide a method for manufacturing the stainless steel article at low costs, and a product made of the stainless steel article.

Solution to Problems (I) According to one aspect of the present invention, there is provided a dispersion strengthened austenitic stainless steel article. The dispersion strengthened austenitic stainless steel article has a chemical composition including: 16 mass % or more and 26 mass % or less of Cr (chromium); 8 mass % or more and 22 mass % or less of Ni (nickel); 0.005 mass % or more and 0.08 mass % or less of C (carbon); 0.002 mass % or more and 0.1 mass % or less of N (nitrogen); 0.02 mass % or more and 0.4 mass % or less of O (oxygen); at least one of 0.2 mass % or more and 2.8 mass % or less of Zr (zirconium), 0.4 mass % or more and 5 mass % or less of Ta (tantalum), and 0.2 mass % or more and 2.6 mass % or less of Ti (titanium); and a balance consisting of Fe (iron) and inevitable impurities. The Zr component, the Ta component, and the Ti component form inclusion particles in the stainless steel article by combining with the C component, the N component, and the O component. The dispersion strengthened austenitic stainless steel article has an average grain size of 1 μm or less and a maximum grain size of 5 μm or less. Meanwhile, in the present invention, crystal grain size is ruled by measuring in conformity with Japanese Industrial Standards (JIS) G 0551 "Steels—Micrographic determination of the apparent grain size".

In the above dispersion strengthened austenitic stainless steel article (I) of the invention, the following modifications and changes can be made.

(i) The inclusion particles may be dispersed in the stainless steel article at a number density of $1 \times 10^{22}$ m$^{-3}$ or more.

(ii) The inclusion particles may have an average grain size of 0.05 μm or less.

(iii) The chemical composition may further comprise 0.1 mass % or more and 1 mass % or less of Mn (manganese) and/or 0.1 mass % or more and 1 mass % or less of Si (silicon).

(II) According to another aspect of the invention, there is provided a method for manufacturing the above dispersion strengthened austenitic stainless steel article. The method includes: an alloy powder synthesizing step of synthesizing an alloy powder having the above chemical composition by mechanical alloying or mechanical milling; a powder grading step of grading/screening the alloy powder to a grain size of 0.3 mm or more and 3 mm or less to prepare a graded powder; and a heating solidification molding step of solidification molding the graded powder at a temperature of 750° C. or more and 1100° C. or less to manufacture a solidification molded body.

In the above method for manufacturing the dispersion strengthened austenitic stainless steel article (II) of the invention, the following modifications and changes can be made.

(iv) The graded powder may comprise grain particles having an average Vickers hardness of 300 Hv or more.

(v) The method may further include a working shaping step of performing machining on the solidification molded body at a temperature of room temperature or more and 1100° C. or less to shape a desired shaped body.

(vi) The method may further include a homogenization heat treatment step of performing heat treatment for homogenization on the solidification molded body or the desired shaped body at a temperature of 600° C. or more and 1100° C. or less.

(III) According to still another aspect of the invention, there is provided a product made of the above dispersion strengthened austenitic stainless steel article. The product is a nuclear power plant member used under neutron irradiation environment.

In the above product made of the dispersion strengthened austenitic stainless steel article (III) of the invention, the following modifications and changes can be made.

(vii) The nuclear power plant member may be a control rod in a nuclear reactor.

Advantages of the Invention

According to the invention, there can be provided an austenitic stainless steel article having superior irradiation resistance and stress corrosion cracking resistance than before while maintaining the mechanical properties equivalent to those of conventional ones. Also, it is possible to provide a method for manufacturing the austenitic stainless steel article at low costs, and a product made of the austenitic stainless steel article.

DETAILED DESCRIPTION OF THE PREFERRED EMBODIMENTS (Basic Idea of the Invention)

As described before, as a relationship between grain size and mechanical strength of a metal material, the hall-petch relationship is established empirically, and it is known that the mechanical strength (e.g., tensile strength) increases with refinement of a crystal grain. For example, in the case of an iron-based metal material, when an average grain size is refined to about 5 μm, the tensile strength thereof increases to about 1.5 times as compared with an iron-based metal material having an average grain size of several tens of micrometers. In addition, the iron-based metal material does not significantly lose ductility even when the crystal grain is refined. Therefore, it is said that the refinement of average grain size is preferable for the mechanical properties.

Moreover, the grain boundary of a metal material is known to act as an annihilation site of a crystal defect. Therefore, an increase in grain boundary through refinement of crystal grains is expected to lead to relaxation of crystal defect concentration. For example, even when a crystal defect (irradiation defect) is introduced in a metal material by neutron irradiation, irradiation defect concentration is expected to be restrained from increasing insofar as crystal grains are refined. In other words, when the crystal grains are refined, the irradiation resistance (resistance to irradiation assisted corrosion cracking) of the metal material is expected to improve.

Figure 1:
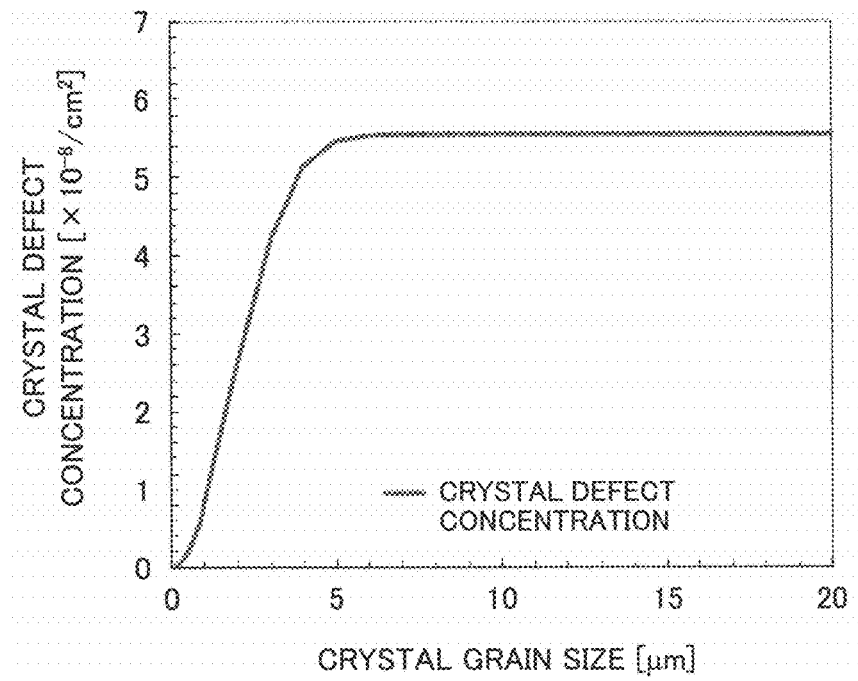
FIG. 1 is a graph showing an example of calculation results of a relationship between the crystal grain size and the crystal defect concentration in a metal material.

Thus, the inventors have studied and reviewed a relationship between the crystal grain size and the crystal defect concentration in a metal material. FIG. 1 is a graph showing an example of calculation results of a relationship between the crystal grain size and the crystal defect concentration in a metal material. As shown in FIG. 1, it is confirmed that the refinement of crystal grain size reduces the crystal defect concentration. Specifically, it is found that, when the crystal grain size is more than 5 μm, there is little variation in the crystal defect concentration; however, when the crystal grain size is 5 μm or less, the crystal defect concentration starts decreasing obviously. When the crystal grain size is 2 μm, as compared with the crystal grain size of more than 5 μm, the crystal defect concentration is reduced to ½. Furthermore, when the crystal grain size is 1 μm or less, as compared with the crystal grain size of more than 5 μm, the crystal defect concentration is reduced to ⅙ or less.

From the aforementioned results of the review, the inventors consider that the austenitic stainless steel according to the invention preferably has an average crystal grain size of 1 μm or less and a maximum crystal grain size of 5 μm or less. The maximum crystal grain size is more preferably 4.5 μm or less, even more preferably 4 μm or less. In addition, the inventors consider that, in the crystal grain size distribution, a 50% size (median size) is more preferably 1 μm or less.

However, it is not easy to manufacture a metal article having the aforementioned microstructure at low cost. In other words, there has been a problem that the cost is increased when a metal article having such a microstructure is manufactured within the scope of the conventional technique. Thus, the inventors have conducted intensive research on a technique of manufacturing an austenitic stainless steel article having a desired microstructure at low cost.

As a result, it has been found that, in powder metallurgy using alloy powder, in addition to preparation of an alloy powder having a desired chemical composition by mechanical alloying or mechanical milling, both grading/screening the alloy powder to a graded powder having a grain size larger than that of the conventional technique and performing powder metallurgy using the graded powder having a larger grain size are very important processes. A combination of these processes can lead to stable manufacturing an austenitic stainless steel having the aforementioned microstructure.

The technical idea that a metal article having the aforementioned microstructure is manufactured by powder metallurgy using an alloy powder having a larger grain size than that of the conventional technique is contrary to the conventional technical idea, and the results are surprising. In addition, an alloy powder having a larger grain size is easier than fine powder in terms of productivity and handling ability, contributing to a further reduction in cost. The present invention has been made on the basis of the aforementioned technical knowledge.

Hereinafter, preferred embodiments according to the invention will be described along procedures for manufacturing the dispersion strengthened austenitic stainless steel article. However, the invention is not limited to the specific embodiments described herein, but combination or improvement may be properly made without departing from the technical concept of the invention.

Figure 2:
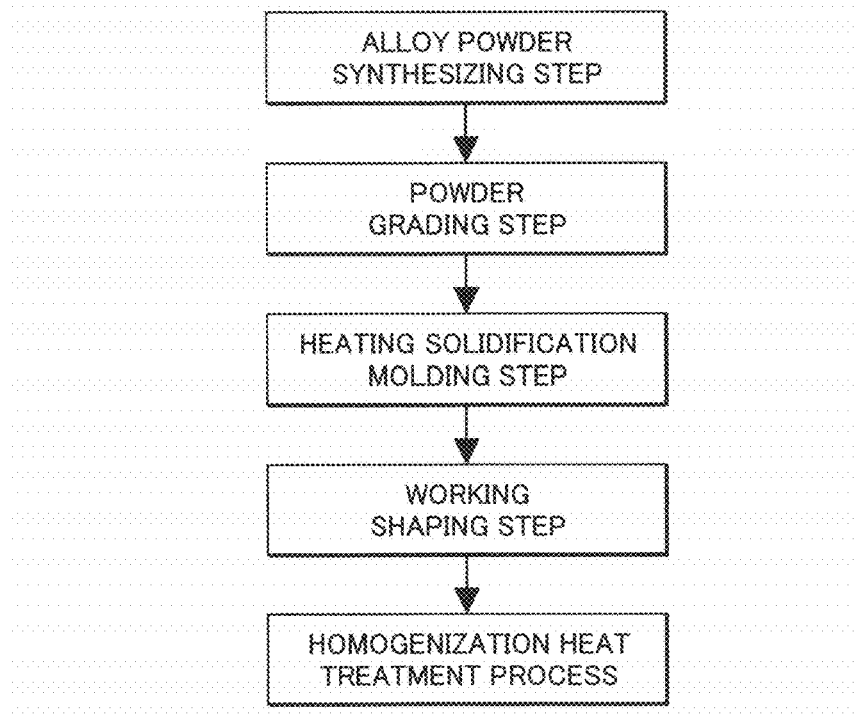
FIG. 2 is an exemplary operation flowchart showing a method for manufacturing a dispersion strengthened austenitic stainless steel article according to the invention.

FIG. 2 is an exemplary operation flowchart showing a method for manufacturing a dispersion strengthened austenitic stainless steel article according to the invention. As shown in FIG. 2, a manufacturing method of the invention at least includes an alloy powder synthesizing step, a powder grading step, and a heating solidification molding step, and may further include a working shaping step and a homogenization heat treatment step as necessary. The preferred embodiments of the invention are described below in more detail.

[Alloy Powder Synthesizing Step]

First, an alloy powder having a desired chemical composition is prepared by mechanical alloying (MA) or mechanical milling (MM). There is no particular limitation on the method of MA or MM, and conventional methods may be used.

The dispersion strengthened austenitic stainless steel article of the invention is a Fe—Cr—Ni-based alloy having Fe, Cr, and Ni as main components. Specifically, it is preferable to have chemical compositions described below.

Cr: 16 to 26 mass %

A Cr component contributes to an increase in corrosion resistance of a stainless steel article and stabilizes an austenite phase. The content of the Cr component is preferably 16 mass % or more and 26 mass % or less, more preferably 18 mass % or more and 20 mass % or less. When the Cr content is less than 16 mass %, the required corrosion resistance cannot be met adequately. When the Cr content is more than 26 mass %, a brittle intermetallic compound (e.g., a phase) is easily generated, significantly reducing ductility and toughness of the stainless steel article.

Ni: 8 to 22 mass %

An Ni component stabilizes an austenite phase and provides a stainless steel article with ductility and toughness. The content of the Ni component is preferably 8 mass % or more and 22 mass % or less, more preferably 8 mass % or more and 12 mass % or less. When the Ni content is less than 8 mass %, the advantageous effects of the Ni component cannot be obtained adequately. When the Ni content is more than 22 mass %, a brittle intermetallic compound is easily generated, reducing mechanical properties of the stainless steel article.

C: 0.005 to 0.08 mass %

A C component is a component having an advantageous effect of hardening a stainless steel article by being solid solved. Concurrently, the C component is an impurity component that tends to combine with a constituent metal component of stainless steel to generate carbide (e.g., Cr carbide) and cause the carbide to precipitate at grain boundary, thereby reducing the corrosion resistance and the toughness of the stainless steel article. When the C content is less than 0.005 mass %, the advantageous effects of the C component cannot be obtained adequately. When the content of the C component is controlled to 0.08 mass % or less, the negative influences can be suppressed. The C content is more preferably 0.02 mass % or less.

N: 0.002 to 0.1 mass %

An N component is also a component having an advantageous effect of hardening a stainless steel article by being solid solved. Concurrently, the N component is an impurity component that tends to combine with a constituent metal component of stainless steel to generate and precipitate a nitride (e.g., Cr nitride), thereby reducing the irradiation resistance and the stress corrosion cracking resistance of the stainless steel article. When the N content is less than 0.002 mass %, the advantageous effects of the N component cannot be obtained adequately. When the content of the N component is controlled to 0.1 mass % or less, the negative influences can be suppressed. The N content is more preferably 0.05 mass % or less.

O: 0.02 to 0.4 mass %

An O component is an impurity component that tends to combine with a constituent metal component of stainless steel to generate and precipitate an oxide (e.g., Fe oxide), thereby reducing the toughness of the stainless steel article and accelerating grain boundary corrosion. When the stainless steel article is subjected to heating solidification molding in a powder metallurgy method, it is difficult to suppress the content of the O component to less than 0.02 mass %. However, in the case of the stainless steel article of the invention, the negative influences can be suppressed when the content of the O component is controlled to 0.4 mass % or less. The O content is more preferably 0.3 mass % or less.

(Subcomponents)

The stainless steel article of the invention further includes, as a subcomponent, at least one of Zr, Ta and Ti. Each of the Zr component, the Ta component and the Ti component plays a role in decarburization, denitrification, and deoxidization in the present stainless steel article. The Zr component, the Ta component and the Ti component form compounds with the impurity components C, N and O to collect and stabilize the impurity components, thereby reducing the negative influences on the stainless steel article (e.g., suppression of a reduction in corrosion resistance and a reduction in toughness).

Among the aforementioned three components, when the Zr component is added alone, its content is preferably 0.2 mass % or more and 2.8 mass % or less. Among the three components, when the Ta component is added alone, its content is preferably 0.4 mass % or more and 5 mass % or less. Among the three components, when the Ti component is added alone, its content is preferably 0.2 mass % or more and 2.6 mass % or less. In addition, the total content of the three components is more preferably controlled to fall within a range of two times or more and ten times or less of the total content of the C component, the N component and the O component.

When the contents of the three components fall below the aforementioned lower limits, the advantageous effects of collecting and stabilizing the impurity components C, N and O cannot be obtained adequately. When the contents of the three components exceed the aforementioned upper limits, the ductility and the toughness of the stainless steel article are degraded.

The Zr, Ta and Ti components, which have not formed a compound with the impurity components C, N and O, are solid solved in the matrix phase to have a secondary advantageous effect of increasing the corrosion resistance of the stainless steel article. This is presumably because the atomic size (e.g., atomic radius) of the three subcomponents is larger than the atomic size of the three main components (Fe, Cr and Ni) and the solid solution of the subcomponents generates strain in the crystal lattice so that the lattice strain acts as an annihilation site of crystal defects.

(Other Subcomponents)

The stainless steel article of the invention preferably further includes, as other subcomponents, Mn and/or Si. These other subcomponents are described below.

Mn: 0.1 to 1 mass %

An Mn component is a subcomponent that plays a role in desulfurization and deoxidization, and contributes to an increase in mechanical strength and toughness in the present stainless steel article. The content of the Mn component is preferably 0.1 mass % or more and 1 mass % or less. When the Mn content is less than 0.1 mass %, the advantageous effects of the Mn component cannot be obtained adequately. In addition, when the Mn content is more than 1 mass %, a coarse grain of a sulfide (e.g., MnS) is formed, thereby constituting a cause of deterioration of the corrosion resistance or the mechanical strength.

Si: 0.1 to 1 mass %

An Si component is a subcomponent that plays a role in deoxidization and increases heat resistance and mechanical strength in the present stainless steel article. The content of the Si component is preferably 0.1 mass % or more and 1 mass % or less. When the Si content is less than 0.1 mass %, the advantageous effect of the Si component cannot be obtained adequately. In addition, when the Si content is more than 1 mass %, a coarse grain of an oxide (e.g., $SiO_2$) is formed, thereby constituting a cause of reduction in the toughness.

(Balance Components)

In the austenitic stainless steel article of the invention, the chemical composition of the balance consists of Fe and inevitable impurities (e.g., phosphorus and sulfur). The balance components are described below.

Fe Component

An Fe component is one of the main components of a stainless steel and is a basic component for ensuring the mechanical strength.

P: more than 0 mass % and 0.01 mass % or less

A P (phosphorus) component is an inevitable impurity that tends to segregate at a grain boundary of a stainless steel article and reduces the toughness of the stainless steel article and the corrosion resistance at the grain boundary. When the content of the P component is controlled to 0.01 mass % or less, the negative influences can be suppressed. The P content is more preferably 0.006 mass % or less.

S: more than 0 mass % and 0.01 mass % or less

An S (sulfur) component is also an impurity component that tends to combine with a constituent component of stainless steel to generate a sulfide (e.g., Fe sulfide) having a relatively low melting point and reduces the toughness and the pitting corrosion resistance of the stainless steel article. When the content of the S component is controlled to 0.01 mass % or less, the negative influences can be suppressed. The S content is more preferably 0.003 mass % or less.

[Powder Grading Step]

A powder grading step in which grading/screening is performed to have a grain size of 0.3 mm or more and 3 mm or less to prepare a graded powder is performed on the alloy powder obtained by the aforementioned alloy powder synthesizing step. There is no particular limitation on the grading method, and conventional methods may be used.

When the graded powder has a grain size of less than 0.3 mm, in a sintering process in a subsequent heating solidification molding step, crystal grains are easily coarsened and it becomes difficult to obtain a stainless steel article having a desired microstructure. When the graded powder has a grain size of more than 3 mm, the powder particles are so excessively large that voids are prone to remain in a sintered body during heating solidification molding, and it becomes difficult to obtain a stainless steel article having a desired mechanical strength.

In addition, particles of the graded powder preferably have an average Vickers hardness of 300 Hv or more, more preferably 350 Hv or more. The Vickers hardness of a powder particle can be considered as an index indicating degree of internal strain of the particle. In other words, it is preferable to prepare a graded powder made of particles with sufficient internal strain accumulation.

According to the conventional technical idea, it has been considered that when a stainless steel article having an average grain size of 1 μm or less is manufactured, it is favorable to prepare an alloy powder having a grain size of at least 1 μm or less (desirably, an alloy powder having a grain size of 0.1 μm or less) as a powder for heating solidification molding in a powder metallurgy. In contrast, the remarkable feature of the present invention is to prepare a graded powder having a grain size larger by at least two digits than that of the conventional technical idea.

[Heating Solidification Molding Step]

Next, a heating solidification molding step in which the aforementioned graded powder is used and subjected to heating solidification molding to manufacture a solidification molded body (i.e., a solidification molded body is manufactured by powder metallurgy) is performed. There is no particular limitation on the heating solidification molding method, and conventional methods may be used. For example, hot isostatic pressing (HIP) or hot extrusion may be used preferably.

As solidification molding conditions, temperature of 750° C. or more and 1100° C. or less and pressure of 100 MPa or more are preferable. When the solidification molding temperature is less than 750° C., the temperature is so excessively low that deformation resistance of the graded powder becomes excessively large, rendering sufficient densification of a solidification molded body difficult. When the solidification molding temperature exceeds 1100° C., the temperature is so excessively high that coarsening of grains (exaggerated grain growth) is prone to occur. On the other hand, when the solidification molding pressure is less than 100 MPa, the densification of the solidification molded body becomes insufficient. The upper limit of the solidification molding pressure depends on a size of the solidification molded body, an output power of a shaping apparatus, and permissible manufacturing costs.

In the heating solidification molding step, the matrix phase of the graded powder is transformed into an austenite phase. In addition, in and on each particle of the graded powder, the aforementioned subcomponents (Zr, Ta, Ti, Mn and Si) combine with the impurity components (C, N and O) to generate inclusion particles (average particle size of 0.05 μm or less). When the amount of inclusion particles to be generated (the particle size is assumed to be 0.05 μm) is calculated from the contents of the subcomponents and the impurity components, number density of the inclusion particles is $1 \times 10^{22}$ m$^{-3}$ or more.

By this heating solidification molding step, a dispersion strengthened austenitic stainless steel article having a desired microstructure (the average crystal grain size of the matrix phase is 1 μm or less, the maximum crystal grain size of the matrix phase is 5 μm or less, and inclusion particles are finely dispersed) is obtained.

A detailed mechanism as to why a desired microstructure is obtained even when a graded powder having a particle size far larger than that of the conventional technique is used is unclear at this moment. However, for example, a model described below is conceivable.

The graded powder used in the invention is synthesized by mechanical alloying or mechanical milling. Therefore, each particle of the powder is understood to have a large internal strain. In each particle of the powder, it is presumed that, in the heating solidification molding step, recrystallization due to the large internal strain stored in the particle occurs at the same time as generation of the aforementioned inclusion particles. In this case, the generated inclusion particles prevent movement of dislocation during recrystallization and movement of a grain boundary. Therefore, it is presumed that the recrystallization progresses to cause each particle itself to be a polycrystalline grain and sintering between the grains progresses simultaneously. As a result, it can be considered that a solidification molded body made of grains each having a grain size smaller than the grain size of a starting powder for the solidification molding is obtained.

[Working Shaping Step]

A working shaping step in which plastic working (e.g., drawing, rolling, and forging) is performed to shape a desired shaped body may be conducted on the solidification molded body obtained by the heating solidification molding step as necessary. This working shaping step is preferably performed in a temperature range of room temperature to 1100° C. The working shaping step provides a more uniform and denser metal structure, enabling a further improvement in the mechanical property of the stainless steel article.

[Homogenization Heat Treatment Step]

A homogenization heat treatment step aiming at homogenization (relaxation of processing strain and homogenization of the matrix phase composition in each grain) may be conducted on the solidification molded body obtained by the heating solidification molding step or the desired shaped body obtained by the working shaping step as necessary. The homogenization heat treatment is preferably performed in a temperature range of 600 to 1100° C.

It is possible to obtain a product made of the dispersion strengthened austenitic stainless steel article of the invention by the aforementioned manufacturing processes.

[Product Made of Stainless Steel Article of the Invention]

Figure 3:
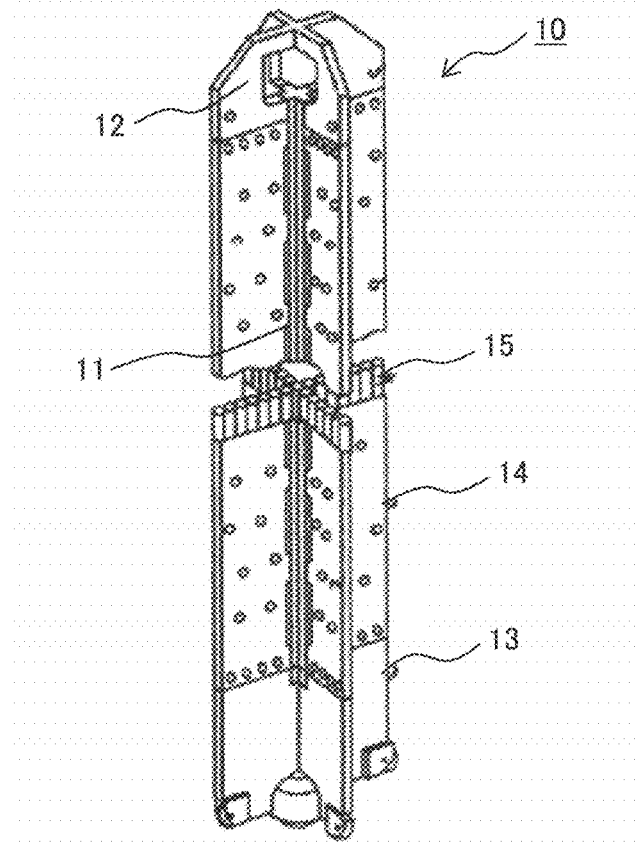
FIG. 3 is a schematic illustration showing a perspective view of a control rod in a nuclear reactor, which is an example of a product made of the dispersion strengthened austenitic stainless steel article according to the invention.

FIG. 3 is a schematic illustration showing a perspective view of a control rod in a nuclear reactor, which is an example of a product made of the dispersion strengthened austenitic stainless steel article according to the invention. The control rod illustrated in FIG. 3 is an example using a boron carbide for a neutron absorber.

A control rod 10 in FIG. 3 comprises a tie rod 11, a handle 12, a connector 13, a sheath 14, and a neutron absorber rod 15, all of which are made of austenitic stainless steel. Irradiation assisted corrosion cracking can occur in the control rod 10 subjected to a large amount of neutron irradiation. Therefore, the dispersion strengthened austenitic stainless steel article of the invention having excellent mechanical property, irradiation resistance, and stress corrosion cracking resistance is used so that a control rod having high durability and long-term reliability can be provided.

The dispersion strengthened austenitic stainless steel article of the invention may be shaped into various shapes (e.g., a bar, a plate and a pipe). Therefore, the dispersion strengthened austenitic stainless steel article of the invention is not limited to the control rod 10 illustrated in FIG. 3, but can be applied to other nuclear power plant members in which irradiation assisted corrosion cracking may be generated by neutron irradiation. For example, the dispersion strengthened austenitic stainless steel article of the invention may be provided as a core shroud, a top lattice plate, a core support plate, a baffle plate, a former plate, and a baffle former bolt. Thus, it is possible to construct a nuclear power plant having excellent durability and long-term reliability.

EXAMPLES

The present invention will further be explained more specifically by Examples and Comparative Examples. However, the invention is not limited to these Examples.

Experimental 1

(Preparation of Alloy Powders 1 to 6)

An austenitic stainless steel powder (manufactured by Höganäs Japan K.K., SUS304L powder, particle size of less than 45 μm) was used as a base alloy powder and was mixed and alloyed with a subcomponent metal by mechanical alloying treatment using a planetary ball mill so as to prepare Alloy Powders 1 to 5. In addition, the same mechanical alloying treatment was performed on the base alloy powder alone (without mixing of a subcomponent metal) to prepare Alloy Powder 6.

As a Zr raw material, which is a subcomponent metal, a metal Zr powder (manufactured by Kojundo Chemical Laboratory Co., Ltd., purity of 98%, particle size of less than 45 µm) was used. As a Ta raw material, a metal Ta powder (manufactured by Kojundo Chemical Laboratory Co., Ltd., purity of 99.9%, particle size of less than 45 µm) was used. As a Ti raw material, a metal Ti powder (manufactured by Kojundo Chemical Laboratory Co., Ltd., purity of 99.9%, particle size of less than 45 µm) was used.

Table 1 indicates the chemical compositions of Alloy Powders 1 to 6.

TABLE 2

Particle size of Alloy Powder 1, average hardness of powder particle, and average grain size of solidification molded body.

| Particle size of alloy powder D (µm) | Average Vickers hardness of powder particle (Hv) | Average grain size of solidification molded body (µm) |
|---|---|---|
| D <300 | 251 | 5.8 |
| 300 ≤ D < 425 | 357 | 0.88 |
| 425 ≤ D < 500 | 396 | 0.84 |
| 500 ≤ D < 600 | 410 | 0.82 |
| 600 ≤ D | 404 | 0.79 |

TABLE 1

Chemical compositions of Alloy Powders 1 to 6 (unit: mass %).

| Alloy Powder | Fe | Cr | Ni | Mn | Si | P | S | C | N | O | Zr | Ta | Ti |
|---|---|---|---|---|---|---|---|---|---|---|---|---|---|
| 1 | Bal. | 19.6 | 11.5 | 0.1 | 0.79 | 0.006 | 0.002 | 0.016 | 0.04 | 0.28 | 1.36 | — | — |
| 2 | Bal. | 19.6 | 11.5 | 0.1 | 0.79 | 0.005 | 0.002 | 0.016 | 0.04 | 0.28 | 1.0 | — | — |
| 3 | Bal. | 19.7 | 11.5 | 0.1 | 0.79 | 0.004 | 0.002 | 0.016 | 0.04 | 0.27 | 0.7 | — | — |
| 4 | Bal. | 19.2 | 11.3 | 0.1 | 0.78 | 0.008 | 0.002 | 0.016 | 0.04 | 0.31 | — | 2.94 | — |
| 5 | Bal. | 19.6 | 11.5 | 0.1 | 0.79 | 0.006 | 0.002 | 0.016 | 0.04 | 0.28 | — | — | 1.41 |
| 6 | Bal. | 19.8 | 11.6 | 0.1 | 0.8 | 0.003 | 0.002 | 0.016 | 0.04 | 0.26 | — | — | — |

Experimental 2

(Relationship Among Particle Size of Alloy Powder, Average Hardness of Powder Particle, and Average Grain Size of Solidification Molded Body)

Alloy Powder 1 prepared in Experimental 1 was subjected to classification by screening and divided into five groups of different particle sizes (less than 300 µm; 300 µm or more and less than 425 µm; 425 µm or more and less than 500 µm; 500 µm or more and less than 600 µm; and 600 µm or more).

Ten particles were randomly sampled from each particle size group, and the Vickers hardness of each particle was measured with a micro Vickers hardness meter (HMV-2T, manufactured by Shimadzu Corporation). For the Vickers hardness of the ten particles, the average value of the Vickers hardness of the eight particles other than the maximum value and the minimum value was determined to be the average Vickers hardness of the particle size group. The results are indicated in Table 2 described below.

Next, the alloy powder of each particle size group was used to make a solidification molded body. Specifically, the alloy powder of each particle size group was enclosed in a capsule in a vacuum-deaerated state, and HIP treatment (temperature of 950° C., pressure of 140 MPa) was performed on the capsule. Then, the homogenization heat treatment (holding for 30 minutes at 1000° C. followed by water cooling) was carried out for relaxation of processing strain, and a solidification molded body of each particle size group was made.

With regard to each resultant solidification molded body, an observation sample was prepared in conformity with JIS G 0571 "Method of oxalic acid etching test for stainless steels", and the average grain size was measured in conformity with JIS G 0551 "Steels—Micrographic determination of the apparent grain size". For the measurement of the grain, a scanning electron microscopy (S-3400N, manufactured by Hitachi High-Technologies Corporation) was used. The results are also indicated in Table 2.

As shown in Table 2, in the case of the alloy powder group having a particle size of less than 300 µm, the powder particle has an average Vickers hardness of less than 300 Hv, and the matrix phase grain of the solidification molded body has an average grain size of 5.8 µm. The average grain size of the solidification molded body of the group is much smaller than the particle size of the alloy powder, but does not reach the required level (average grain size of 1 µm or less) of the invention.

In the case of the alloy powder groups having a particle size of 300 µm or more, in each case, the powder particle has an average Vickers hardness of 300 Hv or more, and the matrix phase grain of the solidification molded body has an average grain size of 1 µm or less. From this Experimental 2, it is confirmed that the particle size of the graded powder used for the solidification molded body is preferably 300 µm or more.

As described above, the solidification molded body of the alloy powder group having a particle size of less than 300 µm has an average grain size of more than 1 µm. This is presumably because the average Vickers hardness of the powder particle is lower than those of the other groups so that the accumulation of internal strain in each particle would be insufficient. A particle having a small size is presumed to have been subjected to a larger impact or processing during the mechanical alloying treatment and is usually expected to have a larger internal strain. However, in practice, part of internal strain is presumed to have been relaxed by impact heat or processing heat due to large impact or processing. As a result, it is considered that the powder particles of the group having a small particle size tend to have a lower average Vickers hardness.

It is separately confirmed that Alloy Powders 2 to 5 also provide similar results as Alloy Powder 1.

Experimental 3

(Average Grain Size, Maximum Grain Size and State of Inclusion Particle in Solidification Molded Body)

Alloy Powders 1 to 6 prepared in Experimental 1 were subjected to classification by screening to prepare Graded Powders 1 to 6 having a particle size of 300 μm to 2 mm. Next, Graded Powders 1 to 6 were used to make Solidification Molded Bodies 1 to 6 as in Experimental 2, respectively.

In addition, a base alloy powder (SUS304L powder, particle size of less than 45 μm) without being mixed with a subcomponent metal and without being subjected to the mechanical alloying treatment was used alone to make Solidification Molded Body 7 as in Experiment 2. Solidification Molded Bodies 1 to 5 are examples of the present invention, and Solidification Molded Bodies 6 and 7 are comparative examples.

Figure 4:
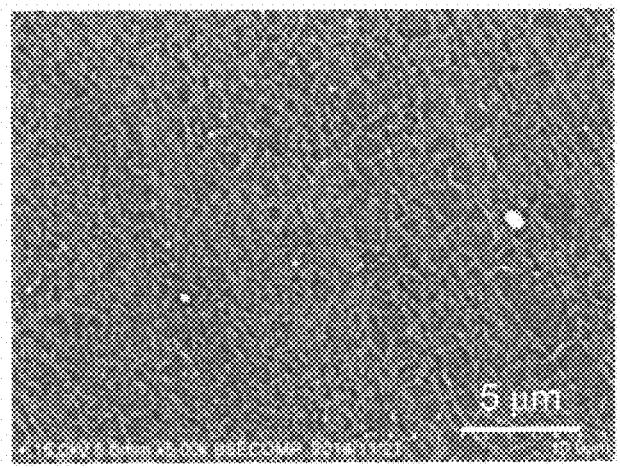
FIG. 4 is an example of a scanning electron microscopy observation image of Solidification Molded Body 1.
Figure 5:
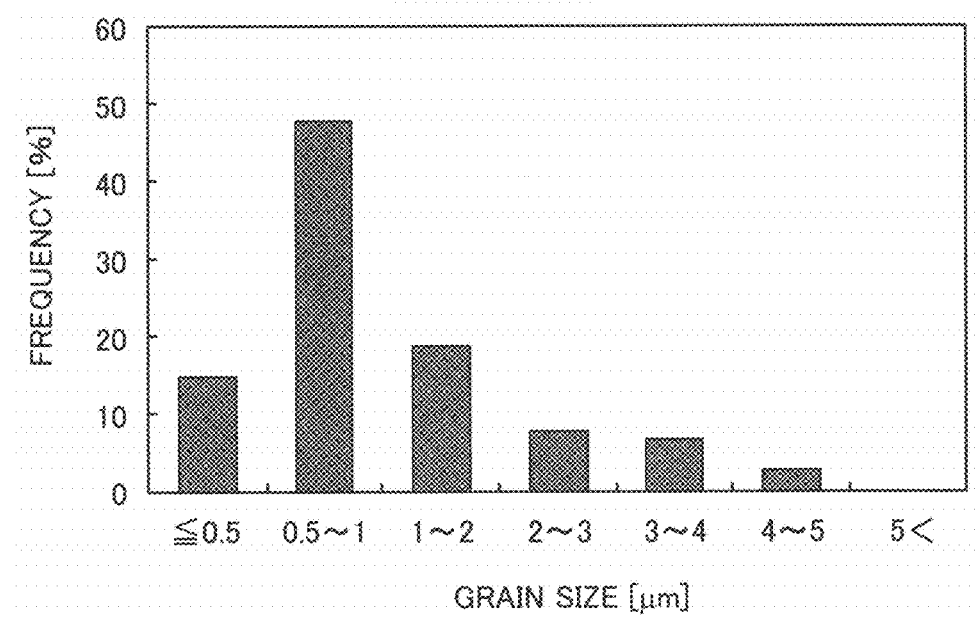
FIG. 5 is a graph showing a grain size distribution of a matrix phase grain of Solidification Molded Body 1.

With regard to each resultant solidification molded body, as in Experiment 2, an observation sample was prepared in conformity with JIS G 0571, and the average grain size and the maximum grain size were measured in conformity with JIS G 0551. In addition, scanning electron microscopy/electron backscatter diffraction (SEM/EBSD) analysis was used to measure the grain size distribution of grains. The results are indicated in FIGS. 4 and 5, and Table 3.

Furthermore, a replica sample collected by extraction replica method was used to measure the average particle size and the number density of an inclusion particle. For measurement of the inclusion particle, a scanning transmission electron microscope (HD-2700, manufactured by Hitachi High-Technologies Corporation) was used. The results are also indicated in Table 3.

TABLE 3

Average grain size and maximum grain size of solidification molded body, and average particle size and number density of inclusion particle in solidification molded body.

| Solidification molded body | Alloy powder | Matrix phase grains | | Inclusion particles | |
|---|---|---|---|---|---|
| | | Average grain size (μm) | Maximum grain size (μm) | Average particle size (nm) | Number density (×$10^{22}$ m$^{-3}$) |
| 1 | 1 | 0.82 | 4.6 | 38 | 5.2 |
| 2 | 2 | 0.74 | 4.8 | 27 | 3.3 |
| 3 | 3 | 0.79 | 4.9 | 22 | 2.9 |
| 4 | 4 | 0.88 | 4.5 | 45 | 10.1 |
| 5 | 5 | 0.85 | 4.2 | 33 | 5.5 |
| 6 | 6 | 31 | 67 | — | — |
| 7 | Base powder | 48 | 103 | — | — |

FIG. 4 is an example of an SEM observation image of Solidification Molded Body 1, and FIG. 5 is a graph showing a grain size distribution of a matrix phase grain of Solidification Molded Body 1. As shown in FIGS. 4 and 5, it can be seen that Solidification Molded Body 1 according to the invention has a metal structure made of fine grains without growth of a coarse grain. In addition, it can be seen from the grain size distribution of FIG. 5 that a 50% size (median size) is 1 μm or less.

More specifically, as shown in Table 3, in the case of Solidification Molded Bodies 1 to 5 according to the invention, in each case, the matrix phase grains have an average grain size of 1 μm or less and a maximum grain size of 5 μm or less. Moreover, it is confirmed that the inclusion particles have an average particle size of 50 nm or less and are dispersed at a number density of 1×$10^{22}$ m$^{-3}$ or more.

In the case of Solidification Molded Body 6, which is a comparative example, the matrix phase grains have an average grain size of 31 μm and a maximum grain size of 67 μm, indicating a greatly coarsened grain in comparison with the examples of the invention. In addition, in the case of Solidification Molded Body 7, the matrix phase grains have an average grain size of 48 μm and a maximum grain size of 103 μm, indicating further great coarsening. Such a difference between the examples and the comparative examples is presumed to be attributable to presence or absence of the inclusion particles because of the presence or absence of the addition of a subcomponent metal (Zr, Ta and Ti). Furthermore, the difference between Solidification Molded Bodies 6 and 7 is presumed to be attributable to the degree of accumulation of internal strain of the powder particles.

Experimental 4

(Tensile Strength of Solidification Molded Body)

Test pieces for tensile test were collected from Solidification Molded Bodies 1 to 7 made in Experimental 3, and room-temperature tensile test and high-temperature tensile test (300° C.) were conducted with a material universal testing machine to measure the tensile strength. The results are indicated in Table 4.

TABLE 4

Room-temperature tensile strength and 300° C. tensile strength of solidification molded body.

| Solidification molded body | Room-temperature tensile strength (MPa) | 300° C. tensile strength (MPa) |
|---|---|---|
| 1 | 884 | 724 |
| 2 | 882 | 727 |
| 3 | 884 | 715 |
| 4 | 830 | 699 |
| 5 | 892 | 711 |
| 6 | 572 | 431 |
| 7 | 570 | 437 |

As shown in Table 4, in each case of Solidification Molded Bodies 1 to 5 that are examples of the invention, the room-temperature tensile strength is approximately 1.5 times and the 300° C. tensile strength is approximately 1.7 times as compared with those of Solidification Molded Bodies 6 and 7 that are comparative examples. This is presumably because of the advantageous effect of the grain refinement in the invention.

Meanwhile, the grain size of Solidification Molded Body 6 is smaller than that of Solidification Molded Body 7 (see Table 3), but the tensile strength is almost equivalent to that of Solidification Molded Body 7. As can be predicted from the hall-petch relationship, it is confirmed that this level of grain size difference within a grain size range of several tens of micrometers has small influences on the mechanical strength property.

Experimental 5

(Influences of Heating Temperature in Heating Solidification Molding Step)

The influences of heating temperature in the heating solidification molding step were studied using Graded Powder 2 prepared in Experimental 3. Specifically, the heating temperature of HIP treatment was changed in a range of 750 to 1100° C. and the other conditions were the same as Experimental 2. Thus, Solidification Molded Bodies 2a to 2d were prepared.

With regard to the resultant Solidification Molded Bodies 2a to 2d, as in Experimentals 3 and 4, the average grain size, the maximum grain size, and the room-temperature tensile strength were measured. The results are indicated in Table 5.

TABLE 5

Heating temperature, average grain size, maximum grain size, and room-temperature tensile strength of solidification molded body.

| Solidification molded body | Heating temperature of HIP (° C.) | Average grain size (μm) | Maximum grain size (μm) | Room-temperature tensile strength (MPa) |
|---|---|---|---|---|
| 2a | 750 | 0.57 | 3.5 | 975 |
| 2b | 850 | 0.67 | 4.2 | 909 |
| 2c | 950 | 0.73 | 4.8 | 880 |
| 2d | 1100 | 0.97 | 4.7 | 727 |

As shown in Table 5, there is a tendency that an increase in heating temperature of the HIP treatment increases the average grain size and the maximum grain size, and reduces the room-temperature tensile strength. It is confirmed from this Experimental 5 that the heating temperature of the heating solidification molding step is preferably 1100° C. or less in order to achieve an average grain size of 1 μm or less and a maximum grain size of 5 μm or less.

In general, a metal shaped body with a larger grain size is less likely to cause a creep deformation. Therefore, the creep characteristics are presumed to exhibit a tendency opposite to the room-temperature tensile strength. Thus, it is desirable that the heating temperature of the heating solidification molding step be selected in consideration of the tensile strength and the creep characteristics required for the solidification molded body.

Experimental 6

(Corrosion Resistance of Solidification Molded Body)

Test pieces for corrosion test were collected from Solidification Molded Bodies 1 to 3, 6 and 7 made in Experimental 3, and an entire surface corrosion test was performed. The entire surface corrosion test was performed such that the test piece was immersed for 2000 hours in high-temperature and high-pressure water (temperature: 288° C., pressure: 8 MPa, dissolved oxygen concentration: 8 ppm) simulating water-reactor environment.

The test piece was taken out of the high-temperature and high-pressure water, and then an oxide generated on the surface of the test piece was removed. Then, the mass of the test piece was measured to calculate an amount of mass variation before and after the corrosion test (i.e., an amount of elusion from the solidification molded body). The ratios of the amount of mass variation of the other solidification molded bodies were determined with reference to the amount of mass variation (100%) of Solidification Molded Body 7, which was a comparative example. A smaller ratio means that the amount of mass variation (amount of elusion) is small (i.e., corrosion resistance is high). The results are indicated in Table 6.

TABLE 6

Corrosion resistance of solidification molded body to high-temperature and high-pressure water environment.

| Solidification molded body | Ratio of amount of elusion (%) |
|---|---|
| 1 | 87 |
| 2 | 84 |
| 3 | 91 |
| 6 | 101 |
| 7 | 100 |

As shown in Table 6, in the cases of Solidification Molded Bodies 1 to 3, which are examples of the invention, it is confirmed that the amount of elution is smaller by about 10% or more than those of Solidification Molded Bodies 6 and 7, which are comparative examples. Regarding stainless steels, in general, it is said that inclusion dispersion and precipitation dispersion constitute a cause of reducing the corrosion resistance in high-temperature and high-pressure water environment. However, the examples of the invention with inclusion dispersion have increased corrosion resistance over the comparative examples without inclusion dispersion or precipitation dispersion. This is presumably because of the positive effect of the grain refinement.

Experimental 7

(Stress Corrosion Cracking Resistance of Solidification Molded Body)

Test pieces for stress corrosion cracking test were collected (eight pieces in each case) from Solidification Molded Bodies 1 to 3, 6 and 7 made in Experimental 3, and a stress corrosion cracking acceleration test (creviced bending beam (CBB) test) was conducted. Shaper processing was performed on the surface of each test piece, and each test piece was subjected to sensitization heat treatment (holding for 24 hours at 620° C. followed by air cooling). This CBB test was performed such that, as in Experimental 6, the test piece was immersed for 2000 hours in high-temperature and high-pressure water (temperature: 288° C., pressure: 8 MPa, dissolved oxygen concentration: 8 ppm) simulating water-reactor environment.

The test piece was taken out of the high-temperature and high-pressure water, and then the maximum depth of cracking generated on the surface of the test piece was measured. In this experiment, a depth of 40 μm or more was defined as cracking. The results are indicated in Table 7.

TABLE 7

Stress corrosion cracking resistance of solidification molded body.

| Solidification molded body | Maximum depth of cracking (μm) |
|---|---|
| 1 | 96 |
| 2 | 92 |
| 3 | 91 |
| 6 | 201 |
| 7 | 198 |

As shown in Table 7, in the cases of Solidification Molded Bodies 1 to 3, which are examples of the invention, it is confirmed that the maximum depth of cracking is half or less of those of Solidification Molded Bodies 6 and 7, which are comparative examples, and that Solidification Molded Bodies 1 to 3 have excellent stress corrosion cracking resistance. This is presumably because of the positive effect of the grain refinement.

Experimental 8

(Irradiation Resistance of Solidification Molded Body)

Test pieces for ion irradiation test were collected from Solidification Molded Bodies 2, 3 and 6 made in Experimental 3, and an ion irradiation test was carried out. Irradiation test conditions were as follows: test piece temperature: 300° C., irradiation ion: $Fe^{3+}$ ion, irradiation energy: 6.4 MeV, and amount of irradiation damage: 1.0 dpa. After ion irradiation, a nano-indentation tester (Nano indenter G200, manufactured by Agilent Technologies Japan, Ltd.) was used to measure the hardness of the surface of the test piece to calculate the amount of hardness variation before and after the ion irradiation test. A smaller amount of hardness variation means that the irradiation resistance is higher. The results are indicated in Table 8.

TABLE 8

Irradiation resistance of solidification molded body.

| Solidification molded body | Amount of hardness variation (GPa) |
|---|---|
| 2 | 0.6 |
| 3 | 0.0 |
| 6 | 1.3 |

As shown in Table 8, in the cases of Solidification Molded Bodies 2 and 3, which are examples of the invention, it is confirmed that the amount of hardness variation is half or less as compared with that of Solidification Molded Body 6, which is a comparative example, and that Solidification Molded Bodies 2 and 3 have excellent irradiation resistance. This is presumably because of the positive effect of the grain refinement.

The above-described embodiments and Examples have been specifically given in order to help with understanding on the present invention, but the invention is not limited to the configuration equipped with all the components described above. For example, some of the configurations of a certain embodiment may be replaced with the configurations of the other embodiments, and the configurations of the other embodiments may be added to the configurations of the subject embodiment. Furthermore, some of the configurations of each embodiment may be omitted, replaced with other configurations, and added to other configurations.

LEGEND

10 . . . control rod;
11 . . . tie rod;
12 . . . handle;
13 . . . connector;
14 . . . sheath; and
15 . . . neutron absorber rod.

The invention claimed is:

1. A method for manufacturing a dispersion strengthened austenitic stainless steel article, wherein the stainless steel article has a chemical composition comprising: 16 mass % or more and 26 mass % or less of Cr; 8 mass % or more and 22 mass % or less of Ni; 0.005 mass % or more and 0.08 mass % or less of C; 0.002 mass % or more and 0.1 mass % or less of N; 0.02 mass % or more and 0.4 mass % or less of O; at least one of 0.2 mass % or more and 2.8 mass % or less of Zr, 0.4 mass % or more and 5 mass % or less of Ta, and 0.2 mass % or more and 2.6 mass % or less of Ti; and a balance being Fe and inevitable impurities,
   wherein the Zr component, the Ta component, and the Ti component form inclusion particles in combination with the C component, the N component, and the O component, and
   wherein the stainless steel article has an average grain size of 1 μm or less and a maximum grain size of 5 μm or less, the method comprising:
   an alloy powder synthesizing step of synthesizing an alloy powder having the chemical composition by mechanical alloying or mechanical milling;
   a powder grading step of grading the alloy powder to a grain size of 0.3 mm or more and 3 mm or less to prepare a graded powder; and
   a heating solidification molding step of solidification molding the graded powder at a temperature of 750° C. or more and 1100° C. or less to manufacture a solidification molded body.

2. The method for manufacturing dispersion strengthened austenitic stainless steel article according to claim 1, wherein the graded powder comprises grain particles having an average Vickers hardness of 300 Hv or more.

3. The method for manufacturing dispersion strengthened austenitic stainless steel article according to claim 1, further comprising a working shaping step of performing machining on the solidification molded body at a temperature of room temperature or more and 1100° C. or less to shape a desired shaped body.

4. The method for manufacturing dispersion strengthened austenitic stainless steel article according to claim 1, further comprising a homogenization heat treatment step of performing heat treatment for homogenization on the solidification molded body or the desired shaped body at a temperature of 600° C. or more and 1100° C. or less.

5. The method for manufacturing dispersion strengthened austenitic stainless steel article according to claim 2, further comprising a working shaping step of performing machining on the solidification molded body at a temperature of room temperature or more and 1100° C. or less to shape a desired shaped body.

6. The method for manufacturing dispersion strengthened austenitic stainless steel article according to claim 2, further comprising a homogenization heat treatment step of performing heat treatment for homogenization on the solidification molded body or the desired shaped body at a temperature of 600° C. or more and 1100° C. or less.

7. The method for manufacturing dispersion strengthened austenitic stainless steel article according to claim 3, further comprising a homogenization heat treatment step of performing heat treatment for homogenization on the solidification molded body or the desired shaped body at a temperature of 600° C. or more and 1100° C. or less.

8. The method for manufacturing dispersion strengthened austenitic stainless steel article according to claim 5, further comprising a homogenization heat treatment step of performing heat treatment for homogenization on the solidification molded body or the desired shaped body at a temperature of 600° C. or more and 1100° C. or less.

* * * * *